April 25, 1933.  H. HEFTY  1,905,867
VENTILATED CABINET
Filed June 1, 1931  2 Sheets-Sheet 1

INVENTOR
Henry Hefty.
By Ralph _____
ATTORNEY

April 25, 1933.  H. HEFTY  1,905,867
VENTILATED CABINET
Filed June 1, 1931   2 Sheets-Sheet 2
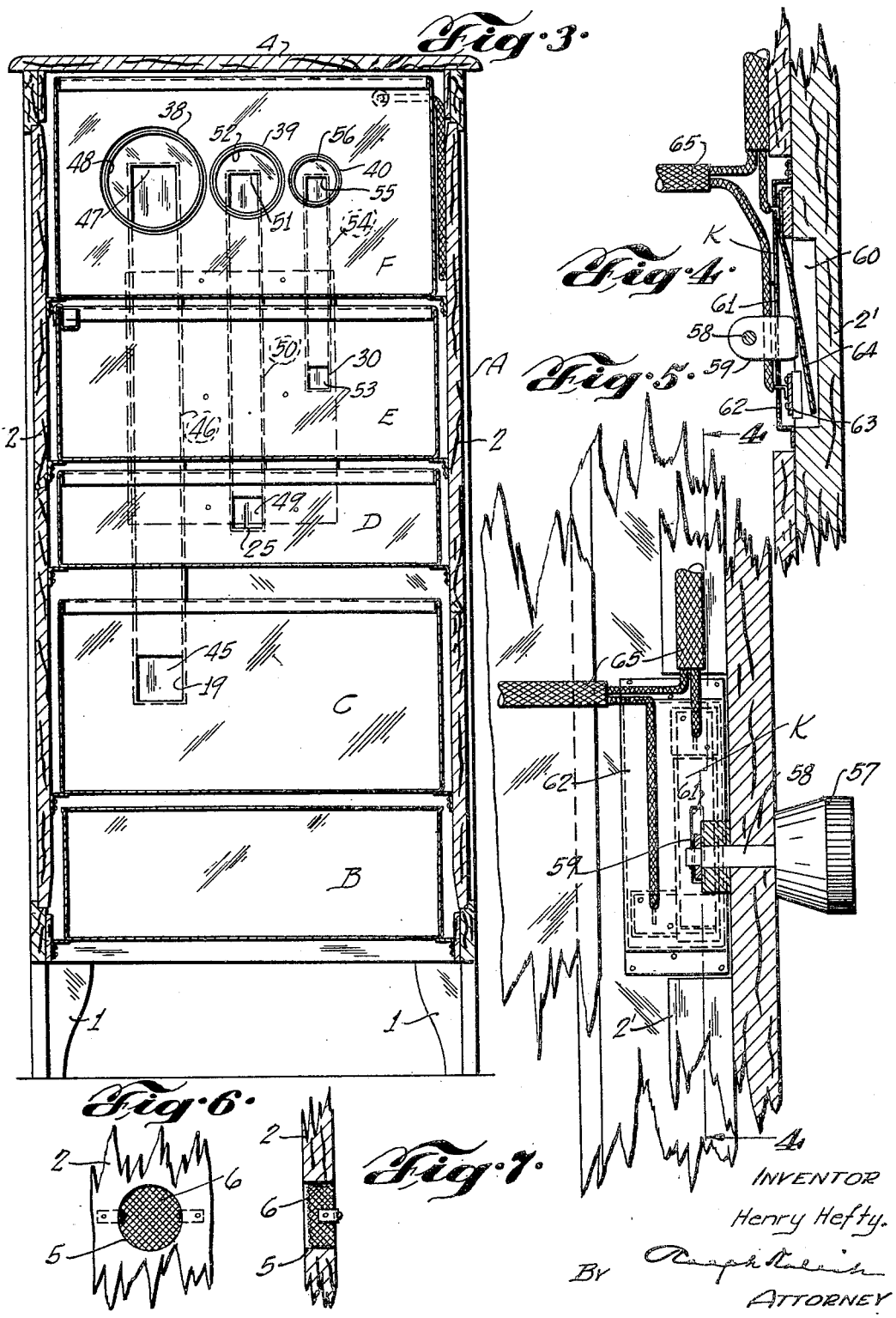
INVENTOR
Henry Hefty.
By
ATTORNEY Patented Apr. 25, 1933

1,905,867

UNITED STATES PATENT OFFICE

HENRY HEFTY, OF ST. LOUIS, MISSOURI

VENTILATED CABINET

Application filed June 1, 1931. Serial No. 541,294.

This invention relates generally to ventilated cabinets and has more particular reference to a ventilated cabinet for the storage of food stuffs and the like.

My invention has for its chief object the provision of a ventilated cabinet especially, though not exclusively, adapted for the storage of food stuffs, and incorporating most accessibly suitably formed shiftable compartments, drawers, and trays, in form and dimensions suited for containing various edible commodities in most convenient and highly practical manner for maintaining the same in a freshened, attractive, and edible condition.

Other objects of my invention are to provide, in a cabinet of the character set forth, means for effecting a positive circulation of ventilating air through the cabinet and more particularly into the individual drawers or trays thereof, and to provide means for controlling the actuation of the ventilating means in a highly effective, automatic, and economical manner.

And with the above and other objects in view, my invention resides in the novel features of form, construction, arrangement, and combination of parts hereinafter described and pointed out in the claims.

In the accompanying drawings (two sheets)—

Figure 3 is a sectional view of the cabinet taken approximately along the line 3—3, Figure 2;

Figure 4 is a fragmentary sectional view of the cabinet, showing a combination latching-and-switching device adapted for employment in connection with the cabinet, the view being taken approximately along the line 4—4, Figure 5;

Figure 5 is a fragmentary interior side view of the cabinet, also showing the latching and switching device of Figure 4, one of the doors of the cabinet being shown in section;

Figure 6 is an enlarged fragmentary interior side view of one of the ventilating apertures in the side walls of the cabinet; and Figure 7 is a sectional view through the ventilating aperture of Figure 6.

Figures 1, 2:
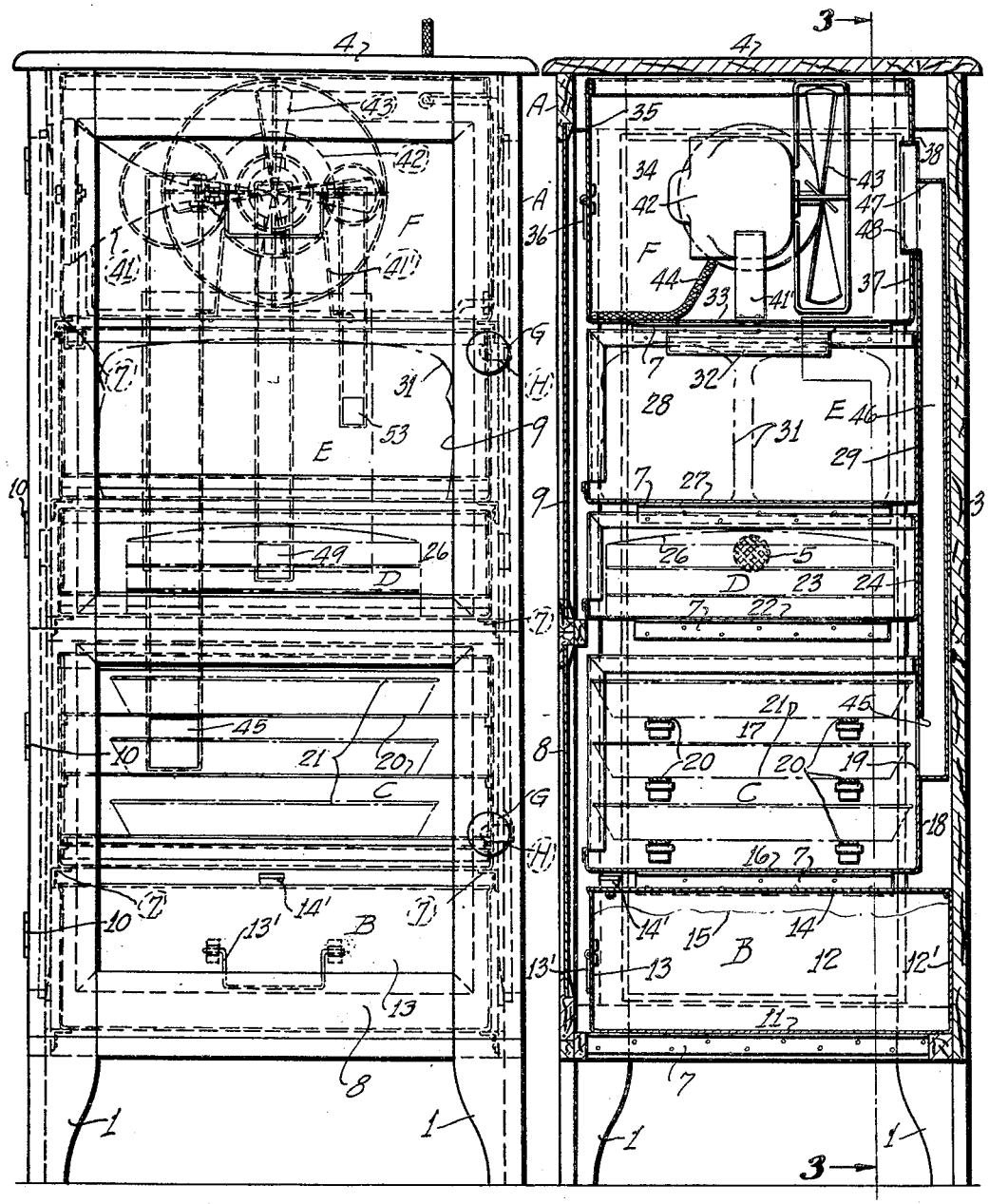
Figure 1 is a front elevational view of a food-cabinet embodying my invention.
Figure 2 is a vertical sectional view of the cabinet.

Referring now more in detail and by reference characters to the drawings, which illustrate a preferred embodiment of my invention, A designates the shell of the cabinet, which is constructed preferably of wood, as shown, or of metal or other suitable material, and supported from the floor on corner legs 1, the cabinet-shell including side walls 2, a back-wall 3, and a top wall 4. The cabinet or shell A may be, and preferably for ventilation purposes is, open at the bottom, and the side walls 2 are further intermediately provided with ventilation apertures 5, each suitably protected by means of an inserted screen 6 or the like (Figures 6 and 7).

On the side walls 2 of the cabinet are mounted superimposed pairs of oppositely disposed slides 7, there being five such pairs of slides 7 in the cabinet shown. The slides 7 may be angle-members each with its vertical depending leg residing against, and suitably attached to, the corresponding wall 2, the horizontal leg of each member 7 being hence presented inwardly of the cabinet.

The several pairs of slides 7 are designed to shiftably or slidably support thereupon respective compartments, drawers, or trays, namely, in the present cabinet, so called or designated storage compartments or drawers B, C, D, and E, and a so-called or designated main compartment or drawer F, each adapted, when closed or fully inserted in the cabinet, for approximately abutting the cabinet rear wall 3.

The front of the cabinet is closable by a pair of preferably glazed doors 8, 9, hinged, respectively, as at 10, to one side wall 2, the doors 8, 9, being latchable on the other wall 2 in a manner presently to be described. The lower door 8, when open, exposes the drawers B and C, and in like manner the upper door 9 is adapted for exposing the drawers D, E, and F.

The drawer B comprises a box having a bottom wall 11 and upstanding side walls 12, a rear wall 12', and a front wall 13, the latter having a pull-handle 13'. Hinged to the rear wall 12', is a lid or box-cover 14 provided at its front margin with a handle 14'. The drawer B is designed to contain flour or other food commodity, as indicated by dot-dash lines at 15, in Figure 2.

The next upper drawer C comprises a box having a bottom wall 16, upstanding side walls 17, and a rear wall 18, the latter having a ventilation port 19, as best seen in Figure 3. Supported suitably from and between the side walls 17, are superimposed pairs of horizontally aligned transverse rack-bars 20, there being three such pairs of bars 20 in the present instance, each designed suitably for supporting in the drawer C a pie or like food commodity containing pan or tray 21, as shown in dot-dash lines in Figures 1 and 2. The drawer C is preferably open both at its top and front sides.

And in like manner the next superimposed drawer D comprises a box having a bottom wall 22, upstanding side walls 23, and a rear wall 24, the latter having also a ventilation port 25 (Figure 3) offset in vertical relation from, and being preferably of lesser area than, the port 19 in the drawer C therebelow. The drawer D is preferably also open both at its top and front sides and is designed to contain a baked food commodity, as a cake or the like, indicated by dot-dash lines at 26 in Figures 1 and 2.

The drawer E likewise comprises a box having a bottom wall 27, upstanding side walls 28, and a rear wall 29, the latter having a ventilation port 30 (Figure 3), offset in vertical relation from both, and less in area than either, of the ports 19, 25, respectively in the drawers C and D. The drawer E is open at its top and front sides and, as indicated at 31 by dot-dash lines in Figures 1 and 2, is designed to contain pairs of baked bread loaves or like food commodities. Preferably, mounted on one side wall 28 of the drawer E, is a water-containable trough 32 or other suitable humidifying device.

Finally, the top drawer F comprises a box preferably open at its top side for neatly fitting under the top wall 4 of the cabinet A, and having a bottom wall 33 for marginally engaging the corresponding topmost pair of the slides 7. The box F includes upstanding side walls 34, a front wall 35 provided with a handle 36, and a rear wall 37.

The rear wall 37 of the drawer F is provided with a suitable plurality, in the present instance three in number, of preferably circular apertures 38, 39, and 40, which, in the order named, are successively of smaller area, as best seen in Figure 3, and are preferably disposed for vertical alignment, likewise in the order named, with the apertures 19, 25, and 30, respectively, in the corresponding drawers C, D, and E, when the latter are disposed within the cabinet A.

A bracket 41 projects from a side wall 34 of the drawer F for suitably, in co-operation with a bracket 41' upstanding from the bottom wall 33, supporting in the drawer F a prime-mover or electric motor 42 actuable for the power-operation of an air motivating device or fan 43 preferably supported on the shaft of the motor 42 for directing a blast or current of air toward, and for exit or discharge through, the respective apertures 38, 39, 40. Suitable wiring means including preferably a flexible cable 44 or the like, is provided for connecting the motor 42, in a manner permitting shiftable movement of the drawer F, with a suitable electrical circuit presently to be described.

Mounted upon the inner face of the cabinet back wall 3, suitably for abutting engagement with the compartment rear wall 18, and having at its lower end an outlet aperture 45 adapted for communicating registration with the aperture 19 of the drawer C, is a preferably vertical drawer-communicating duct 46 provided at its upper end with an elbow 47 terminating in an annularly flanged inlet aperture 48 adapted for interfitting communicating registration with the corresponding aperture 38 in the wall 37 of the drawer F for affording a path of air circulation between the latter and the drawer C.

In like manner, mounted on the cabinet back wall 3 for abutting engagement with the compartment rear wall 24 and having at its lower end an outlet aperture 49 adapted for communicating registration with the aperture 25 of the drawer D, is a second preferably vertical duct 50 provided at its upper end with an elbow 51 terminating in an annularly flanged inlet aperture 52 adapted for interfitting communicating registration with the corresponding aperture 39 in the wall 37 for affording a path of air circulation between the drawer F and the drawer D.

Also similarly mounted on the cabinet back wall 3 for abutting engagement with the compartment rear wall 29 and having at its lower end an outlet aperture 53 adapted for communicating registration with the aperture 30 of the drawer E, is a third preferably vertical duct 54 provided at its upper end with an elbow 55 terminating in an annularly flanged inlet aperture 56 adapted for interfitting communicating registration with the corresponding aperture 40 in the wall 37 for affording a path of air circulation between the drawer F and the drawer E, all as best seen in Figures 2 and 3.

Each of the doors 8, 9, is conveniently for manipulation thereof provided with a knob G and may be provided also with a suitable spring-latch (not shown in Figure 1). On closing actuation, the upper door 9, and likewise the lower door 8, is adapted at its free margin for suitable co-operation with a door-switch H mounted suitably on an interior portion of the cabinet A, preferably the jamb of the door-opening formed by the adjacent wall 2.

The construction of the door-switch H is well known to those skilled in the electrical art, hence a detailed description thereof is here omitted. I may state, however, that the switch H is so connected in the circuit of the motor 42 as to disconnect the same from its source of current supply when the doors 8, 9 are closed, but to reconnect the motor with the line for actuation of the fan 43 when the doors 8, 9, or either or both of them, is or are opened.

In Figures 4 and 5, however, is shown an alternative form or modification of latching device K, in and with which is incorporated switching means adapted for controlling the actuation of the motor 42. Such device K includes a knob 57 rotarily mounted on the outer face of the door and provided with a shaft 58 projecting through the door for carrying on its inner and a finger 59 adapted, on suitable rotary manipulation of the knob 57, for corresponding swingable actuation relatively to the frame 2' of the door.

Mounted on, and fitting over a recess 60 provided suitably in, the jamb 2', and having a keeper-slot or aperture 61 adapted for latchingly receptive registration of and with the finger 59 when the respective door is in closed position, is a keeper-plate 62. Suitably insulatably mounted on the jamb 2' for residing in the recess 60, is a terminal 63. A spring blade 64 is suitably mounted also on the jamb 2' for residing in the recess 60 normally in circuit establishing engagement or contact with the terminal 63. The blade 64 is disposed in alignment with the notch 61 for co-operative engagement with and by the finger 59 on door-latching engagement thereof in and through the slot 61 for shifting the blade 64 yieldingly in circuit-breaking disengagement from the terminal 63, as shown in Figure 4. By suitable obvious wiring means designated generally at 65, the terminal 63 and blade 64 are connected in the electrical circuit of the motor 42 for controlling the supply of motivating energy thereto.

In use, a suitable source of electrical energy being available and connected in the motor circuit, it will be seen that, when the doors 8, 9, are in closed position, free circulation of air in the cabinet is prevented. The switches H then also disconnect the motor 42 from the source of current supply, and the fan 43 is idle, thereby effecting a high degree of enecomy in the operation of the device. On door opening actuation of either of the doors 8, 9, however, the particular switch H is actuated for closing the circuit to the motor 42, with resulting circulation of air by the fan 43 through the several ducts 46, 50, and 54, and, the door or doors preferably then being widely opened, for access to the contents of the cabinet, the air so circulated quickly passes, and continues to pass, into and through the respective drawers C, D, or E, as the case may be, for thoroughly and in a positive manner scavenging the cabinet of any foul, odorous, or stagnant air.

If the cabinet is equipped with the device K shown in Figures 4 and 5, the motor 42 is connected to the line as the knob 57 is rotarily actuated to move the finger 59 to door-unlatching position, with the consequences, and for the purposes hereinbefore fully set forth.

It will be borne in mind that the water in the trough or troughs 32 tends to evaporate in the cabinet A for maintaining, in conjunction with the fresh volume of air blown thereinto each time a door 8 or 9 is opened, the food stuffs contained in the cabinet in a highly freshened, attractive, and edible condition.

It may be pointed out that the drawer B is adapted, as I have said, for containing flour or like pulverulent material, which material preferably is not to be subjected to a blast or disturbing current of air; hence the cover 14 is provided for the drawer B for shutting out such air currents. It will be understood, however, that the contents of the drawer B are nevertheless efficiently protected from contamination by foul or odorous air or the like by reason of the supply of fresh air to other parts of the cabinet.

It will be seen further that the compartments or drawers B, C, D, and E are each readily removable from or shiftable in the cabinet not only for facilitating access to their contents, but also most conveniently for cleaning the drawers and the interior of the cabinet for maintaining the same in a hygienic wholesome and sanitary condition.

It will be evident that my new cabinet fully accomplishes the objects stated, and it will be further understood that changes and modifications in the form, construction, arrangement, and combination of the several parts of the cabinet may be made and substituted for those herein shown and described without departing from the nature and principle of my invention.

Having thus described my invention, what I claim and desire to secure by Letters Patent is,—

1. A cabinet comprising a shell provided with ducts for communicating one part of the shell with another, drawers shiftable in the shell for communicating registration each with an outlet of a respective duct, one of said drawers including a wall having ports registrable with the respective ducts for communicating all of said ducts with the last named drawer, and means including a fan located within said last-named drawer for circulating a current of air through said ducts and into said drawers.

2. A cabinet including a shell, pairs of superposed slideways within the shell, a main compartment within the shell, ducts leading within the shell from the main compartment, said ducts having their outlets at spaced elevations within the shell, a series of storage drawers shiftable on the slideways and each having a respective port for communicating registration with a respective duct-outlet, and means including a fan in the main compartment for directing a flow of air through the ducts into respective drawers.

3. A cabinet including a shell having an open side, a closure for said shell-side, pairs of superposed slideways within the shell, a main compartment within the shell, ducts of varying length leading within the shell from the main compartment, said ducts having their outlets at spaced elevations within the shell, a series of storage drawers shiftable on the slideways and having respective ports for communicating registration with respective duct-outlets, and electrically controlled means including a fan in the main compartment for directing a flow of air through the ducts and respective drawers when said closure is open.

4. A cabinet including a shell having an open side, a closure for said shell-side, pairs of superposed slideways within the shell, a main compartment within the shell in superposed relation to the slideways, ducts of varying length fixed within the shell and leading downwardly from the main compartment, said ducts having their outlets at spaced elevations within the shell, a series of storage drawers shiftable on the slideways and having respective port for communicating registration with respective duct-outlets, and electrically controlled means including a fan in the main compartment for directing a flow of air through the ducts and respective drawers when said closure is open.

In testimony whereof, I have signed my name to this specification.

HENRY HEFTY.